June 29, 1926.

R. N. KING

FOOT REST

Filed August 29, 1925

1,590,382

Inventor
R. N. King
By Robb, Robb & Hill
Attorneys

Patented June 29, 1926.

1,590,382

UNITED STATES PATENT OFFICE.

ROBERT N. KING, OF EAST CLEVELAND, OHIO.

FOOT REST.

Application filed August 29, 1925. Serial No. 53,253.

The present invention relates to a foot rest of a type which is adapted to be used in automobiles or similar places and has for its object to provide a device of this character which embodies novel features of construction so that it can be moved down and locked in an out of the way position when it is not in use, thereby leaving the floor of the automobile or other vehicle perfectly smooth and free from all projections.

Further objects of the invention are to provide a folding or disappearing foot rest which is simple and inexpensive in its construction, which can be readily applied to the floor of an automobile or like vehicle, which can be quickly moved into either a raised position or a lowered position and which when in operative position will give support for the entire bottom of the foot and be far more comfortable than the usual rail or rod which is used for a foot rest.

While one particular embodiment of the invention is shown and described for illustrative purposes, it will be obvious that many modifications and changes can be made in the details of construction without departing from the spirit of the invention.

For a full understanding of the invention reference is to be had to the following description and accompanying drawings, in which—

Corresponding and like parts are referred to in the following description and indicated on all of the views of the drawings by like reference characters.

Figure 1:
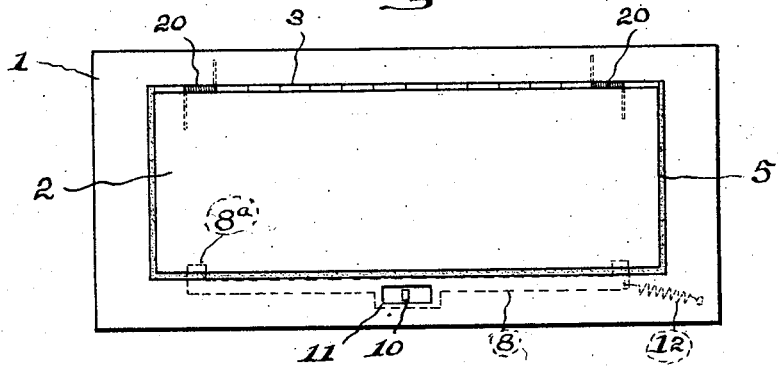
Figure 1 is a top plan view of a foot rest which is constructed in accordance with the invention, the foot rest plate being shown in a lowered position.
Figure 2:
Figure 2 is a rear elevation of the device, the foot rest plate being shown in a lowered position.
Figure 3:
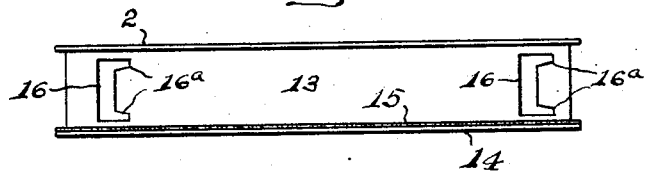
Figure 3 is an edge view of the foot rest plate, viewing the same from the swinging edge thereof.
Figure 4:
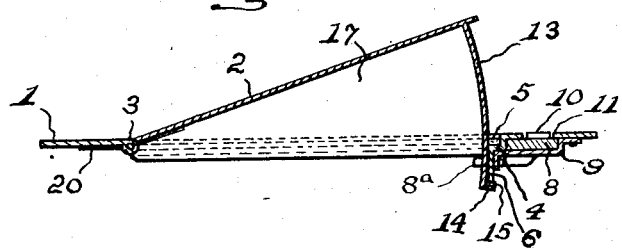
Figure 4 is a transverse sectional view through the foot rest with the foot rest plate shown in a raised position.
Figure 5:
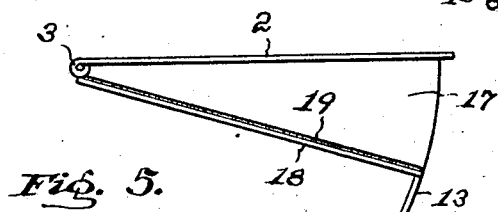
Figure 5 is an end view of the foot rest plate.

Referring to the drawings, the reference character 1 designates a flat frame which is adapted to be let into the floor of an automobile or the like so that it is flush therewith. The frame has an opening therein within which a foot rest plate 2 is mounted, said plate being adapted either to be swung upwardly into an angular position or swung downwardly into a position substantially flush with the frame 1 and floor. The foot rest plate is hingedly connected to one side of the frame 1 along one of its longitudinal edges, as indicated at 3.

The ends of the opening in the frame 1 and the side of the opening which is opposite to the hinge 3 are rabbeted or formed to provide a seat 4 upon which a strip 5 of some fibrous or sound deadening material is placed for the purpose of providing a tight joint and preventing a metal to metal contact when the foot rest plate is swung downwardly. The edges of the foot rest plate then rest upon the packing strip 5 and not only is a substantially air tight joint provided but there is no noise or rattle such as might be present if a metal to metal contact were permitted.

The side of the opening in the frame 1 which is opposite the hinge 3 is formed with a downwardly projecting flange 6 which has longitudinal slots 7 in opposite end portions thereof to receive the laterally projecting ends 8ª of a latch bar 8 which is slidably mounted upon the frame 1. This latch bar 8 is slidably mounted under one side of the frame, being retained in proper position by the keepers 9, and the end portions of the latch bar are off-set downwardly so that the lateral ends 8ª can project through the slots 7. The middle portion of the latch bar is provided with a finger piece 10 which projects upwardly through a slot 11 formed in the side of the frame 1, said finger piece providing a means for moving the latch bar into inoperative position when it is desired to change the position of the foot rest plate. A spring 12 is connected to one end of the latch bar and normally tends to slide the latch bar into operative position.

The swinging edge of the foot rest plate 2 is provided with a depending curved side wall 13 having a lip 14 at the free edge thereof which cooperates with the lower end of the flange 6 to limit the upward movement of the foot rest plate. In order to prevent a metal to metal contact a strip 15 of fibrous material or packing may be applied to the top of the lip 14 for engagement with the flange of the main frame.

The depending side wall 13 of the foot rest plate is provided at opposite end portions thereof with vertically disposed slots 16 which are adapted to receive the lateral ends 8ª of the latch bar when the foot rest plate is moved from a raised position to a lowered position or vice versa. The upper and lower ends of the vertical slots 16 are provided with the lateral notch portions 16ª into which the lateral ends 8ª of the latch bar are movable to lock the foot rest plate in either a raised position or a lowered position. The notches 16ª are preferably tapered toward the ends thereof so that they will have a wedge engagement with the lateral ends 8ª of the latch bar and avoid any looseness which might result in an objectionable rattle when the automobile is in motion.

The ends of the foot rest plate are provided with segmental end walls 17 which are connected to the ends of the side wall 13. These end walls 17 are provided at their lower edges with lips 18 which may have packing strips 19 applied thereto for engagement with the corresponding ends of the frame 1 to assist in limiting the upward movement of the foot rest plate and form a tight joint with the frame 1 when the foot rest plate is swung upwardly into operative position.

When the foot rest is not in use the plate 2 is swung downwardly so that it is flush with the top of the frame 1 and surface of the floor of the automobile. The packing strips 5 then tightly engage the edges of the foot rest plate to form a tight joint so that there will be no objectionable entrance of cold air into the automobile through the device. If a carpet is applied to the floor of the automobile it is provided with slits in the portions thereof which are over the ends and swinging edge of the foot rest plate and the foot rest plate is practically invisible when it is in a lowered position. The floor of the automobile is then free from all projections and this may be very convenient when carrying trunks or the like.

In order to raise the foot rest plate the finger piece or handle 10 is manipulated to slide the latch bar 8 into inoperative position. The foot rest will then be swung upwardly by springs 20 at the ends thereof, and as soon as it reaches the upper limit of its movement the latch bar will be returned to its original position by the spring 12 and the laterally projecting ends 8ª thereof caused to enter the lower notches 16ª of the vertical slot 16, thereby locking the foot rest plate in a raised position. The packing strips 15 and 19 then engage portions of the frame 1 to provide tight joints at the side and ends of the foot rest plate so that the entrance into the car of large quantities of air through the foot rest device is prevented. The use of the packing strips also tends to prevent objectionable rattling of the parts when the automobile or similar vehicle is in motion. The foot rest plate has a sufficient width to provide a support for the entire bottom of the foot and this will be found to be more comfortable than the usual bar which is ordinarily provided for that purpose at the present time.

Having thus described my invention what I claim as new and desire to secure by Letters Patent is,

1. A foot rest comprising a flat frame adapted to be applied to the floor of a vehicle or the like and having an opening therein, a foot rest plate hingedly connected to one of the edges of the frame adjacent the opening and adapted to be either swung upwardly into an angular position or swung downwardly into the opening, depending walls projecting from the edge and ends of the foot rest plate to close the space between the plate and the frame when the plate is raised, a latch bar mounted upon the frame and engaging one of the depending walls of the foot rest plate to lock the latter in either a raised position or a lowered position.

2. A foot rest comprising a flat frame adapted to be applied to the floor of a vehicle or the like and having an opening therein, a foot rest plate hingedly connected to one of the edges of the frame adjacent the opening and adapted to be either swung upwardly into an angular position or swung downwardly into the opening, a depending wall carried by the foot rest plate and having a slot therein with notches in communication therewith, and a locking bolt mounted upon the frame and having a portion projecting into the slot of the depending wall and adapted to engage selected notches to lock the foot rest plate in position.

3. A foot rest comprising a frame adapted to be applied to the floor of a vehicle or the like and having an opening therein, one side of the frame being formed with a slot, a foot rest plate hingedly connected to an edge of the frame adjacent the opening and adapted to be either swung upwardly into an angular position or swung downwardly into the opening, a depending wall carried by the foot rest plate, a latch bar slidably mounted under the main frame at one side thereof and having portions adapted to engage the said depending wall to lock the foot rest plate in an adjusted position, and a finger piece carried by the latch bar and projecting through the before mentioned slot in one side of the main frame whereby the latch bar can be readily moved into and out of operative position.

4. A foot rest comprising a flat frame adapted to be applied to the floor of a vehicle or the like and having an opening therein, a foot rest plate hingedly connected to one of the edges of the frame adjacent the opening and adapted either to be swung upwardly into an inclined position or downwardly into the opening, a flange projecting downwardly from the edge of the opening remote from the said hinge connection and having an opening therein, a latch bar slidably mounted upon the main frame and having a lateral end projecting through the opening of the flange, and a depending wall carried by the foot rest plate, said wall having notched portions adapted to engage the lateral end of the latch bar to lock the foot rest plate in an adjusted position.

5. A foot rest comprising a flat frame adapted to be applied to the floor of a vehicle or the like and having an opening therein, a foot rest plate hingedly connected to one of the edges of the frame adjacent the opening and adapted to be either swung upwardly into an inclined position or swung downwardly into the opening, a flange projecting downwardly from the edge of the opening which is remote from the said hinge connection, said flange having an opening therein, a depending wall carried by the swinging edge of the foot plate, a latch bar slidably mounted upon the main frame and having a lateral portion which projects through the opening in the flange, the depending wall of the foot rest plate having notched portions adapted to engage the said lateral end of the latch bar to lock the foot rest plate in an adjusted position, and a lip carried by the depending wall for cooperation with the flange to limit the upward movement of the foot rest plate.

6. A foot rest comprising a flat frame adapted to be applied to the floor of a vehicle or the like and having an opening therein, a foot rest plate hingedly connected to an edge of the frame adjacent the opening and adapted either to be swung upwardly into an inclined position or downwardly into the opening, a depending flange projecting from the edge of the opening remote to the said hinge connection, a depending side wall carried by the swinging end of the foot rest plate, segmental end walls at the ends of the plate, lips at the lower edges of the side wall and end walls to limit the upward movement of the foot rest plate and form a tight joint with the frame, and means for locking the foot rest plate in either a raised position or a lowered position.

7. A foot rest comprising a flat frame adapted to be applied to the floor of a vehicle or the like, and having an opening therein, a foot rest plate hingedly connected to an edge of the frame adjacent the opening and adapted either to be swung upwardly into an angular position or swung downwardly into the opening, a flange projecting downwardly from the edge of the opening which is opposite said hinge connection, said flange having an opening therein, a latch bar slidably mounted upon the frame and formed with a lateral end which projects through the opening of the flange, a depending side wall carried by the swinging end of the foot rest plate and having notched portions therein adapted to be engaged by the lateral end of the latch bar to lock the foot rest plate in an adjusted position, segmental end walls extending downwardly from the ends of the foot rest plate, and lateral lips at the lower edges of the depending side wall and end walls for cooperation with the flange and frame to limit the upward movement of the foot rest plate and provide a close joint with the frame when the foot rest plate is raised.

In testimony whereof I affix my signature.

ROBERT N. KING.